(12) United States Patent
Lim et al.

(10) Patent No.: US 6,646,661 B2
(45) Date of Patent: Nov. 11, 2003

(54) METHOD FOR MAKING TFT-LCD HAVING BLACK MATRIX IN SOURCE AND DRAIN REGION AND IN ABSENCE OF INSULATOR

(75) Inventors: Byoung Ho Lim, Kumi-shi (KR); Soon Sung Yoo, Kumi-shi (KR); Dong Yeung Kwak, Taegu-shi (KR); Jae Gu Lee, Taegu-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/864,149

(22) Filed: May 25, 2001

(65) Prior Publication Data

US 2001/0048490 A1 Dec. 6, 2001

(30) Foreign Application Priority Data

May 25, 2000 (KR) .......................................... 2000-28396
May 25, 2000 (KR) .......................................... 2000-28397
Jun. 24, 2000 (KR) .......................................... 2000-35105

(51) Int. Cl.[7] ........................ G02F 1/136; G02F 1/1335; G02F 1/1333
(52) U.S. Cl. ........................ 346/44; 349/106; 349/138
(58) Field of Search ................................ 349/110, 111, 349/44, 106, 138

(56) References Cited

U.S. PATENT DOCUMENTS

| 5,420,708 A | * | 5/1995 | Yokoyama et al. ......... 349/106 |
| 5,976,734 A | | 11/1999 | Yamaguchi |
| 6,002,462 A | * | 12/1999 | Sato et al. .................. 349/106 |
| 6,057,900 A | * | 5/2000 | Ono et al. ................... 349/106 |
| 6,162,654 A | * | 12/2000 | Kawabe ....................... 349/106 |

FOREIGN PATENT DOCUMENTS

| JP | 62254122 A1 | 11/1987 |
| JP | 2302727 A1 | 12/1990 |
| JP | 4299312 A1 | 10/1992 |
| JP | 10186345 A1 | 7/1998 |
| WO | 97/20251 | 6/1997 |

* cited by examiner

*Primary Examiner*—Toan Ton
(74) *Attorney, Agent, or Firm*—McKenna Long & Aldridge LLP

(57) ABSTRACT

A liquid crystal display (LCD) device and method for manufacturing the same in which a plurality of patterns are formed on one substrate reduces the manufacturing cost and simplifies the process steps by minimizing the number of masks required to form the patterns. The LCD device includes first and second substrates, a thin film transistor (TFT) formed in a predetermined region on the first substrate, a pixel electrode formed in a pixel region on the first substrate, a color filter layer formed on the pixel electrode, a black matrix pattern formed in a region other than the pixel electrode, and a liquid crystal layer formed between the first and second substrates. The method for manufacturing the LCD device having a pixel region defined by gate and data lines, includes the steps of forming a TFT on a first substrate, forming a black matrix pattern in a region other than the pixel region, forming a pixel electrode in the pixel region, and forming a color filter layer on the pixel electrode.

25 Claims, 20 Drawing Sheets

METHOD FOR MAKING TFT-LCD HAVING BLACK MATRIX IN SOURCE AND DRAIN REGION AND IN ABSENCE OF INSULATOR

CROSS-REFERENCES TO RELATED APPLICATIONS

This application claims the benefit of: Korean Patent Application No. 2000-28396, filed on May 25, 2000; Korean Patent Application No. 2000-28397, filed on May 25, 2000; and Korean Patent Application No. 2000-35105, filed on Jun. 24, 2000 the entirety of each of which is hereby incorporated by reference for all purposes as if fully set forth herein.

BACKGROUND OF THE INVENTION

1. Field of the Invention

The present invention relates to a display device, and more particularly, to a liquid crystal display (LCD) device and a method for manufacturing the same.

2. Discussion of the Related Art

Ultra-thin sized flat panel displays having a display screen with a thickness of several centimeters or less, and in particular, flat panel LCD devices, are widely used in monitors for notebook computers, spacecraft, and aircraft.

Such LCD devices have low power consumption and are easy to carry. In this respect, the LCD device is receiving much attention as an advanced display device that can substitute for a cathode ray tube (CRT).

An LCD device includes a thin film transistor (TFT) substrate, a color filter substrate, and a liquid crystal layer sealed between the TFT substrate and the color filter substrate. The LCD is a non-light-emitting device that can obtain an image effect based on electro-optical characteristics of the liquid crystal layer.

In other words, a TFT array and pixel electrodes are formed on the TFT substrate, while a black matrix pattern, a color filter layer, and a common electrode are formed on the color filter substrate. The TFT substrate and the color filter substrate are bonded to each other by a sealant such as epoxy resin.

A driving circuit is connected with the TFT substrate using a tape carrier package as a medium. The driving circuit generates various control signals and signal voltages to display images.

The development and application of TFT-LCD industries have been accelerated in accordance with an increase of the dimensions and increase of the resolution of LCD devices. To increase the productivity and ensure the low cost, many efforts have been continued in view of simplified process steps and an improvement of yield.

A method for manufacturing an LCD device according to an example of the related art will be described with reference to the accompanying drawings.

FIGS. 1a to 1f are sectional views illustrating process steps of manufacturing a lower substrate of an LCD device according to an example of the related art, and FIGS. 2a to 2e are sectional views illustrating process steps of an upper substrate of an LCD device according to an example of the related art.

A method for manufacturing a lower substrate of an LCD device will be described with reference to FIGS. 1a to 1f.

As shown in FIG. 1a, a metal layer which is a material for a gate electrode, such as Al, Ta, Cr, and Al alloy, is formed on a first insulating substrate 1. A gate electrode 2 is formed by a patterning process using a first mask (not shown).

As shown in FIG. 1b, a gate insulating film 3, preferably of $SiN_x$, is formed on the first insulating substrate 1 including the gate electrode 2 by a chemical vapor deposition (CVD) process. A semiconductor layer 4 is then formed on the gate insulating film 3 over the gate electrode 2.

As shown in FIG. 1c, the semiconductor layer 4 is patterned using a second mask (not shown) to form an active pattern 4a. A metal layer 5 such as Al, Cr, Mo, and Al alloy is formed by a sputtering process and then selectively removed to form a source electrode 6a and a drain electrode 6b, as shown in FIG. 1d. The source and drain electrodes 6a and 6b are formed by an etching process using a third mask (not shown). A passivation film 7 is formed on the entire surface, including the source and drain electrodes 6a and 6b.

As shown in FIG. 1e, a contact hole 8 is formed using a fourth mask (not shown) to expose a portion of the drain electrode 6b. As shown in FIG. 1f, an indium tin oxide (ITO) layer for a pixel electrode is formed on the entire surface so that the layer is electrically connected with the drain electrode 6b through the contact hole 8. The ITO layer is patterned by an etching process using a fifth mask (not shown) to form a pixel electrode 9.

A method for manufacturing an upper substrate for an LCD device will now be described with reference to FIGS. 2a to 2e.

As shown in FIG. 2a, a light-shielding material is formed on a second insulating substrate 1a and patterned by photolithography process using a first mask (not shown) to form a black matrix pattern 12. The black matrix pattern 12 is formed on the second insulating substrate 1a in a matrix arrangement. The black matrix pattern 12 has a double layered structure of $CrO_x$ and Cr or a triple layered structure of $CrO_x$, $CrN_x$ and Cr.

As shown in FIG. 2b, a first color filter 14a among red (R), green (G), and blue (B) color filters, is formed on the black matrix pattern 12 by a photolithography process using a second mask (not shown).

Subsequently, as shown in FIGS. 2c and 2d, a second color filter 14b and a third color filter 14c are selectively formed in the same manner as the formation of the first color 14a. FIG. 2c is a sectional view showing the second color filter 14b, and FIG. 2d is a sectional view showing the third color filter 14c. Although not shown, separate masks (third and fourth masks) are respectively required when the second color filter 14b and the third color filter 14c are formed.

After, the black matrix pattern 12 and R, G, and B color filters 14a, 14b and 14c are formed on the second insulating substrate 1a, then, as shown in FIG. 2e, an ITO layer is formed on the entire surface by a sputtering process and is patterned using a fifth mask (not shown) to form a common electrode 16.

Once the upper substrate and the lower substrate are manufactured as above, the two substrates are bonded to each other and liquid crystal material is injected between the substrates through a liquid crystal injection hole. Thus, the process for manufacturing an LCD device according to the example of the related art is completed.

However, the process for manufacturing an LCD device according to the example of the related art has several problems.

Since a total of ten masks are required in manufacturing the lower and upper substrates the manufacturing cost increases and the process time increases due to a number of photolithography processes, thereby increasing total turn around time (TAT).

SUMMARY OF THE INVENTION

Accordingly, the present invention is directed to an LCD device and a method for manufacturing the same that substantially obviates one or more of the problems due to limitations and disadvantages of the related art.

An object of the present invention is to provide an LCD device and a method for manufacturing the same that reduces the manufacturing cost and TAT, and improves the productivity by minimizing the number of masks required for the process steps.

Another object of the present invention is to provide an LCD device and a method for manufacturing the same in which a color filter layer is formed on a pixel electrode in a state where a TFT is not driven.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an LCD device according to the present invention includes first and second substrates, a TFT formed in a predetermined region on the first substrate, a pixel electrode formed in a pixel region on the first substrate, a color filter layer formed on the pixel electrode, a black matrix pattern formed in a region other than the pixel electrode, and a liquid crystal layer formed between the first and second substrates.

To further achieve these and other advantages and in accordance with the purpose of the present invention, a method for manufacturing an LCD device having a pixel region defined by gate and data lines, includes forming a TFT on a first substrate, forming a black matrix pattern in a region other than the pixel region, forming a pixel electrode in the pixel region, and forming a color filter layer on the pixel electrode. In forming the TFT, when forming source and drain electrodes, an n+ layer between them is removed. When removing the n+ layer, a gate insulating film in a pad region is also removed by an etching process to remove a gate pad.

In another aspect of the present invention, in forming a TFT, a metal layer for the source and drain, an n+ layer for an ohmic contact, and a semiconductor layer of a-Si are patterned, and the patterned metal layer is selectively removed to form source and drain electrodes and at the same time remove an n+ layer between the source and drain electrodes. When removing the n+ layer, a gate insulating film in a pad region may also be removed to expose a gate pad.

Also, when the metal layer is patterned, a connecting pattern which electrically connects the data line with the drain electrode is formed to apply a power source to the pixel electrode.

Consequently, the number of masks required when forming a plurality of patterns on the substrate is minimized to reduce the manufacturing cost, and a color filter material can be electrodeposited by applying a voltage to the data line only in a state such that the TFT is not driven.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1A:
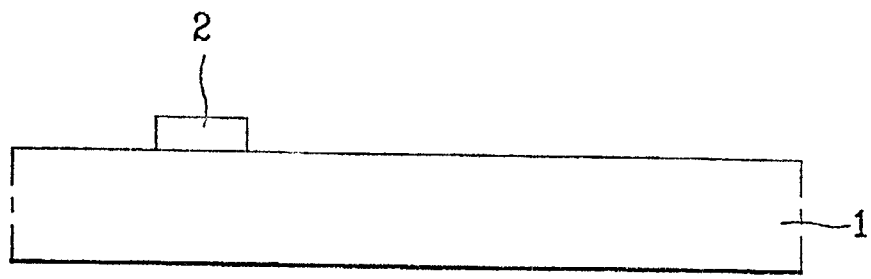
FIGS. 1a to 1f are sectional views illustrating a method for manufacturing a lower substrate for an LCD device according to an example of the related art.
Figure 1B:
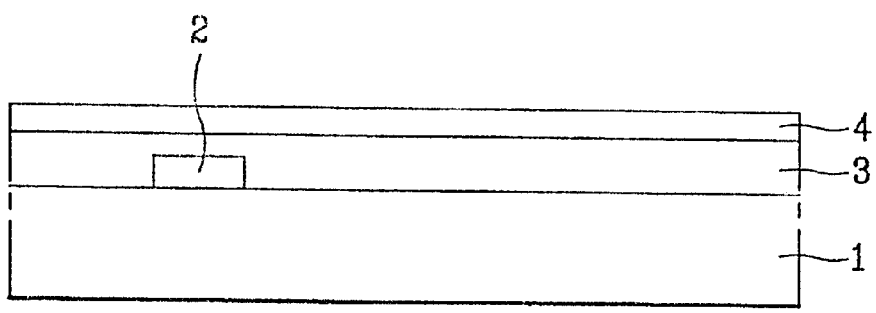
Figure 1C:
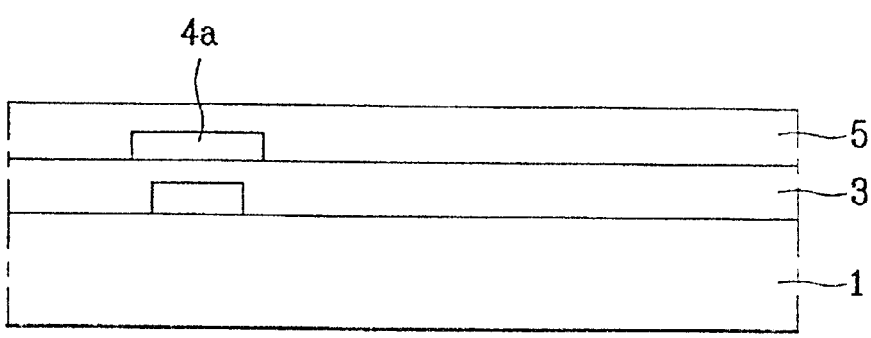
Figure 1D:
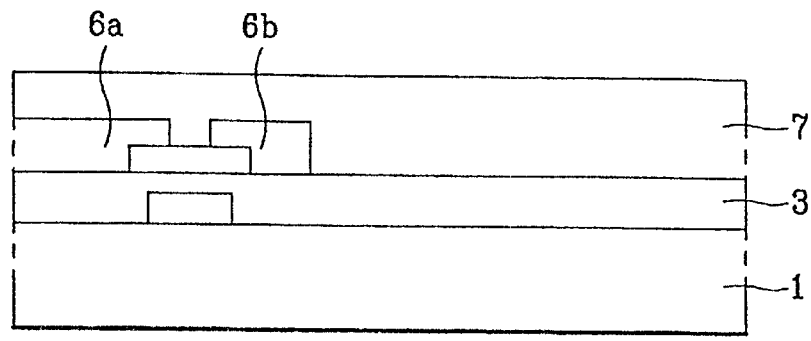
Figure 1E:
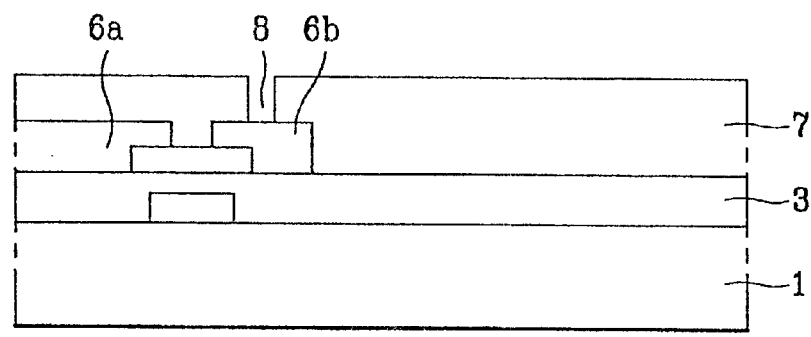
Figure 1F:
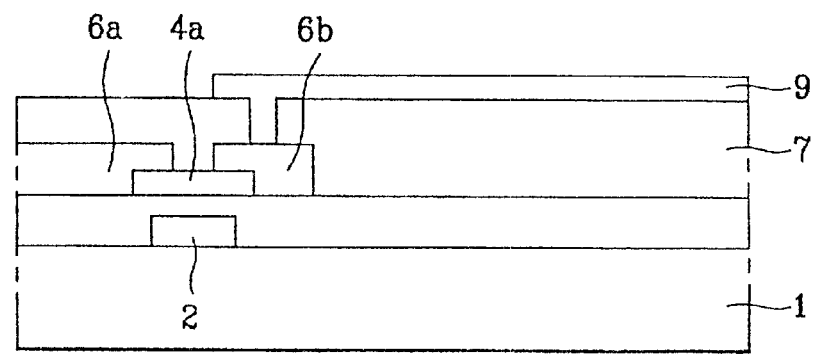
Figure 2A:
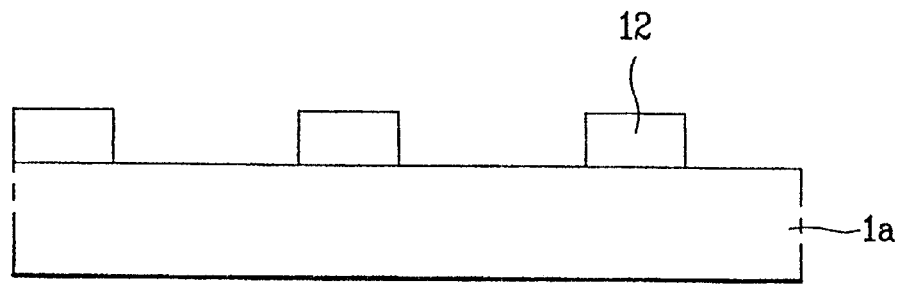
FIGS. 2a to 2e are sectional views illustrating a method for manufacturing an upper substrate for an LCD device according to an example of the related art.
Figure 2B:
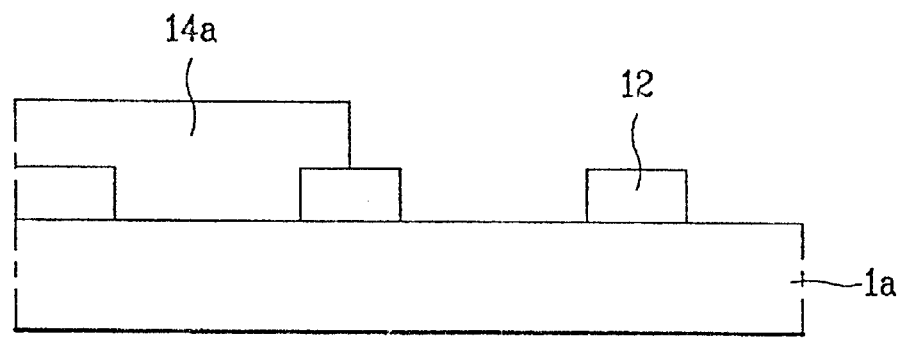
Figure 2C:
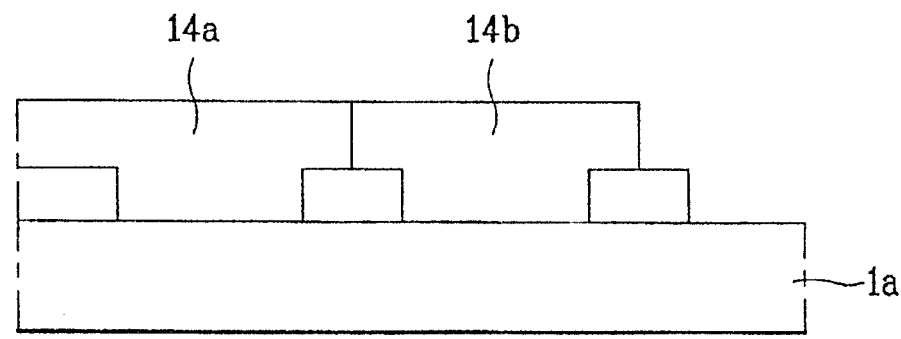
Figure 2D:
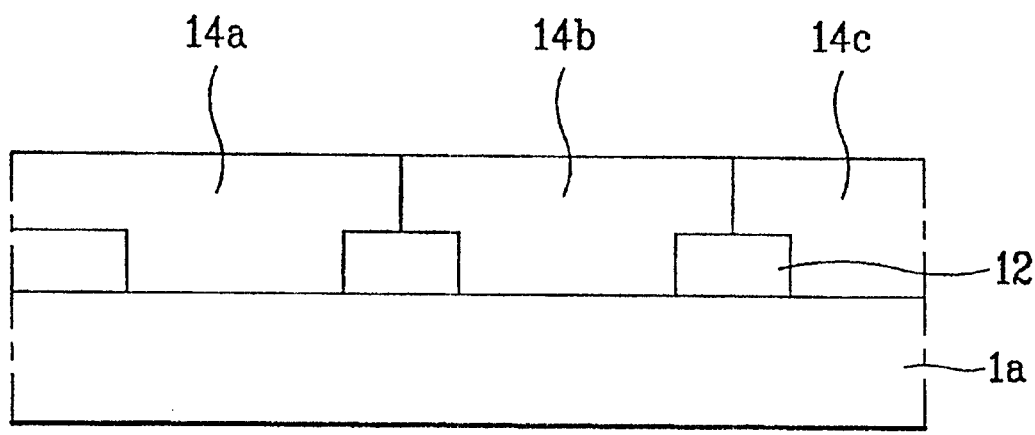
Figure 2E:
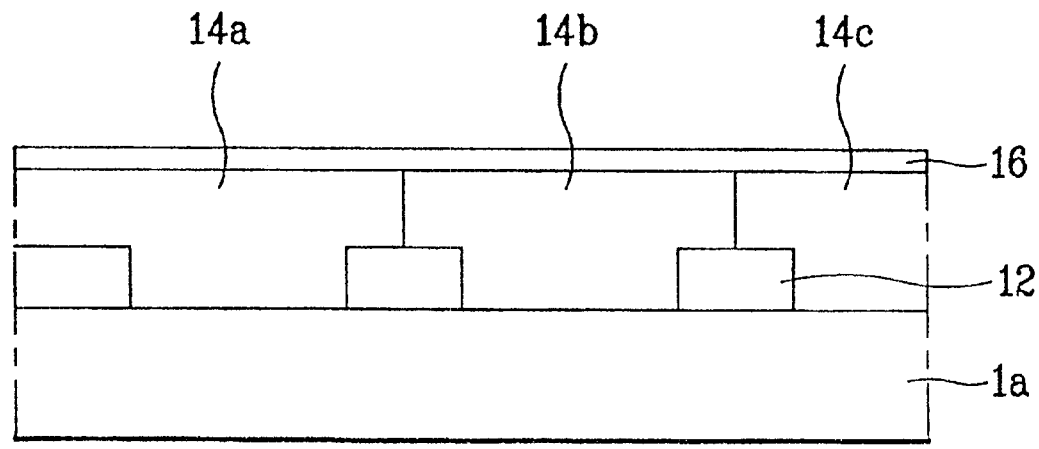
Figure 3:
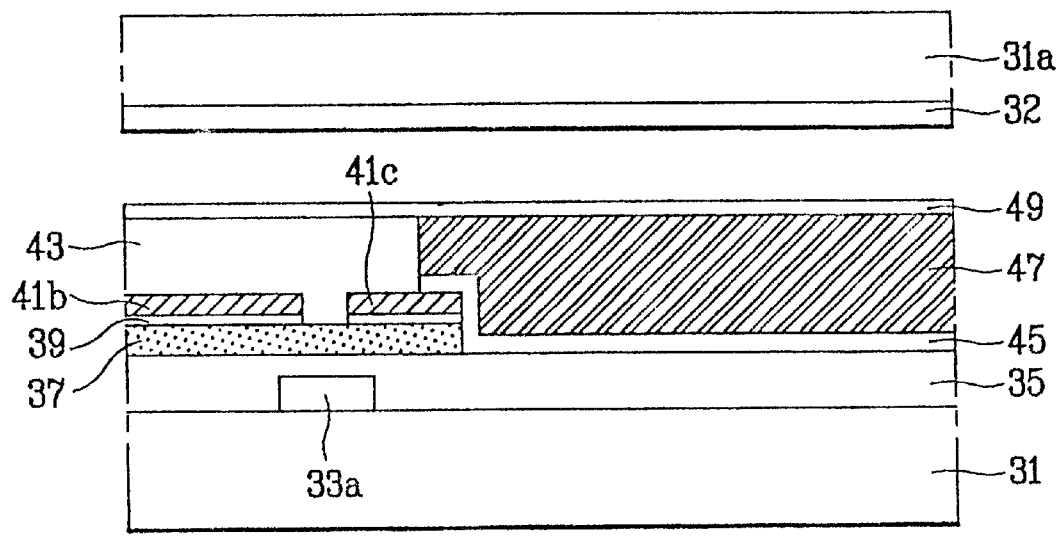
FIG. 3 is a sectional view illustrating a lower substrate for an LCD device according to the first embodiment of the present invention.

FIG. 3 is a sectional view illustrating a lower substrate for an LCD device according to the first embodiment of the present invention, and FIGS. 4a to 4g are sectional views illustrating a method for manufacturing a lower substrate for an LCD device according to the first embodiment of the present invention.

As shown in FIG. 3, the LCD device according to the first embodiment of the present invention includes first and second substrates 31 and 31a, a TFT and a pixel electrode 45 formed on the first substrate 31, a color filter layer 47 formed on the pixel electrode 45, a black matrix pattern 43 formed in a region other than the pixel electrode 45, a common electrode 32 formed on the second substrate 31a, and a liquid crystal layer (not shown) formed between the first and second substrates 31 and 31a.

The TFT includes: a gate electrode 33a patterned on the first substrate 31; a gate insulating film 35 formed on an entire surface of the first substrate 31, including the gate electrode 33a; a semiconductor layer 37 of amorphous silicon (a-Si) patterned on the gate insulating film 35; source and drain electrodes 41b and 41c formed on the a-Si layer 37; and an n+ layer 39 for ohmic contact formed between the source and drain electrodes 41b and 41c and the a-Si layer 37.

The source/drain electrodes 41b and 41c and the n+ layer 39 are etched on the a-Si layer 37. The pixel electrode 45 is directly connected with the drain electrode 41c so that the pixel electrode 45 is formed on the gate insulating film 35.

Preferably, benzocyclobutene (BCB) is used as a material of the black matrix pattern 43. Instead, a metal film such as Cr or a carbon based organic material may be used as the black matrix pattern 43. Alternatively, a double layered film of a Cr compound and Cr, or a triple layered film of a Cr compound and Cr, with another Cr compound interposed between them, may be used as the black matrix pattern 43 for the purpose of low reflection.

Furthermore, since the black matrix pattern 43 shields light and at the same time acts as a passivation film, no separate passivation film is required.

Meanwhile, a binder 49 is further provided on the color filter layer 47 and the black matrix pattern 43 by a binding process.

A method for manufacturing the aforementioned LCD device according to the first embodiment of the present invention will be described with reference to FIGS. 4a to 4g.

Figure 4A:
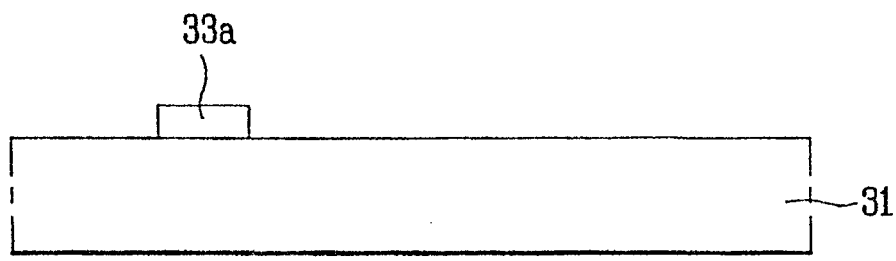
FIGS. 4a to 4g are sectional views illustrating a method for manufacturing a lower substrate for an LCD device according to the first embodiment of the present invention.

As shown in FIG. 4a, the metal layer such as Al, Cr, Mo, Ta, and Al alloy is formed on the first insulating substrate 31 by a sputtering process and then patterned using a first mask (not shown) to form a gate line (not shown) and the gate electrode 33a.

Figure 4B:
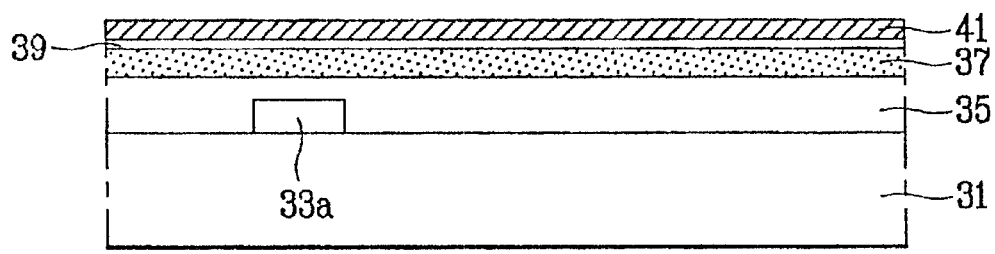

Afterwards, as shown in FIG. 4b, the gate insulating film 35 of, preferably, $SiN_x$ or $SiO_x$ is formed on an entire surface of the first substrate 31 including the gate electrode 33a by a CVD process. The semiconductor layer 37 of a-Si, the n+ layer 39 for an ohmic contact, and the metal layer 41 for the data line and source and drain electrodes are sequentially deposited on the gate insulating film 35.

Figure 4C:
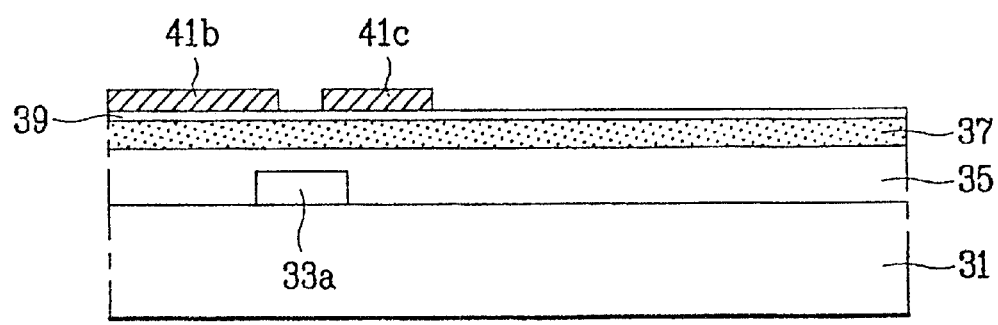

As shown in FIG. 4c, the metal layer 41 is selectively removed by an etching process using a second mask (not shown) so that a data line (not shown) is formed to cross the gate line. The source electrode 41b is formed to extend from the data line, and the drain electrode 41c is formed spaced apart therefrom.

Figure 4D:
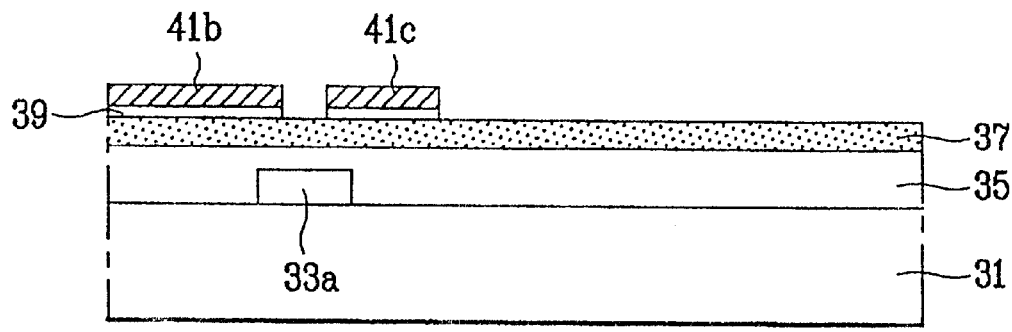

Subsequently, as shown in FIG. 4d, the n+ layer 39 between the source electrode 41b and the drain electrode 41c is removed by a dry etching process. Thus, in a later process, since a light-shielding material layer is formed and then etched in an etching process for forming a contact of the gate pad, a process for exposing the gate pad becomes simple.

Figure 4E:
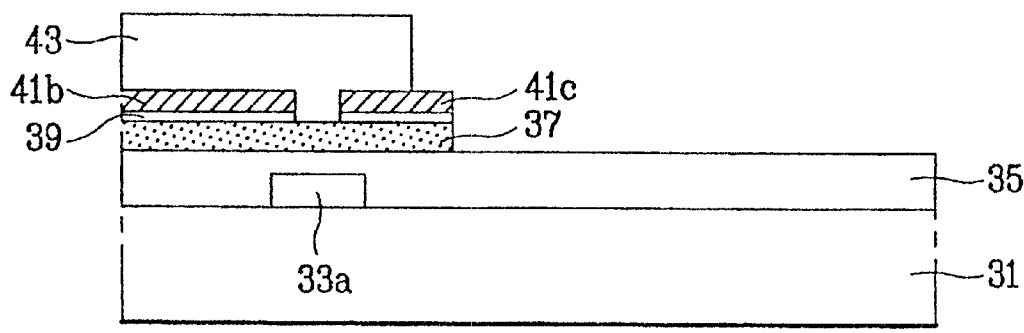

Afterwards, as shown in FIG. 4e, the light-shielding material layer is formed on the entire surface of the substrate 31, including the source and drain electrodes 41b and 41c. The light-shielding material layer is selectively removed by photolithography using a third mask (not shown) to form the black matrix pattern 43 in a region other than the pixel region. At the same time, the a-Si layer 37 formed on the gate insulating film 35 of the pixel region is removed.

Since the black matrix pattern 43 serves as a passivation film, no passivation film is additionally required. Accordingly, the process for forming a passivation film is omitted.

Preferably, BCB is used as a material of the black matrix pattern 43. Instead, a metal thin film such as Cr or a carbon based organic material may be used as the black matrix pattern 43. Alternatively, a double layered film of a Cr compound and Cr, or a triple layered film of a Cr compound and Cr with another Cr compound interposed between them, may be used as the black matrix pattern 43.

Figure 4F:
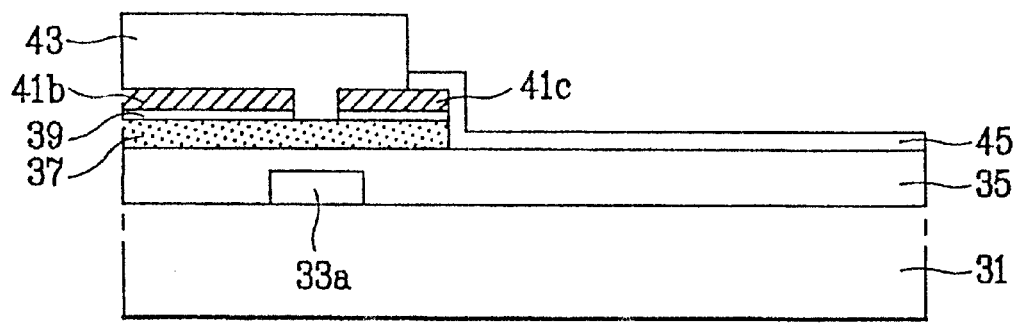

As shown in FIG. 4f, a layer of a transparent conductive material (e.g., ITO) is formed on the entire surface of the substrate 31 including the black matrix pattern 43 by a sputtering process. The ITO layer is then selectively removed by a photolithography process using a fourth mask (not shown) to form the pixel electrode 45 which is directly connected with the drain electrode 41c.

Figure 4G:
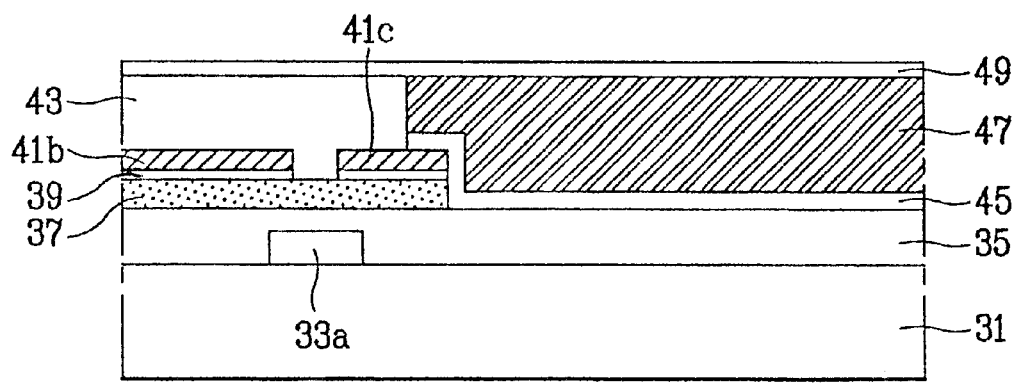

Subsequently, as shown in FIG. 4g, a color filter material is electrodeposited on the pixel electrode 45 to form the color filter layer 47. The binder 49 is then formed on the color filter layer 47 and the black matrix pattern 43 using a binding process.

Afterwards, although not shown, the light-shielding material layer over the gate pad is selectively removed using a pad opening mask (fifth mask) to open the gate pad. Thus, the process for manufacturing the lower substrate is completed.

Also, although not shown, a common electrode is formed on the second substrate (upper substrate), and the first substrate and the second substrate are bonded to each other to inject liquid crystal material between them. The process for manufacturing an LCD device according to the first embodiment of the present invention is completed.

As described above, in the first embodiment of the present invention, since a total six masks are required to manufacture the first and second substrates, the number of masks can remarkably be reduced.

Second Embodiment

FIGS. 5a to 5g are plane views illustrating a method for manufacturing an LCD device according to the second embodiment of the present invention.

In the second embodiment of the present invention, like reference numerals refer to like elements as those of the first embodiment.

Figure 5A:
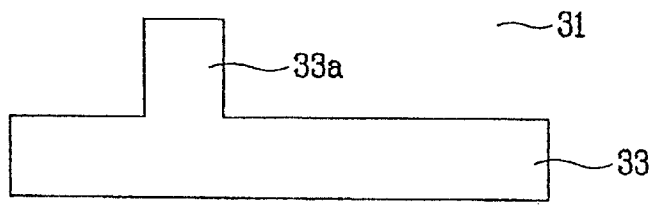
FIGS. 5a to 5g are plane views illustrating a method for manufacturing a lower substrate for an LCD device according to the first embodiment of the present invention.
Figure 5B:
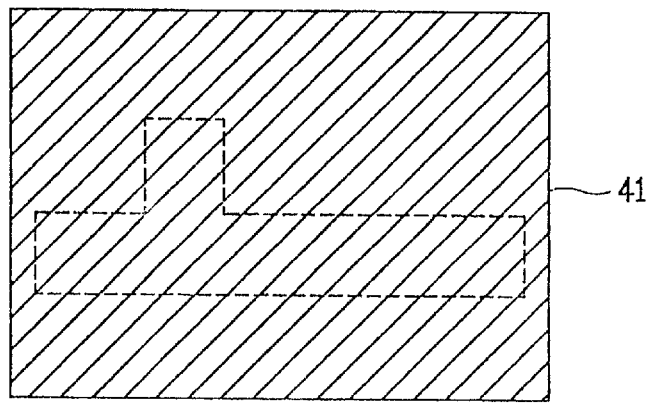

As shown in FIG. 5a, a gate line 33 and a gate electrode 33a are formed on a first substrate 31. Then, a gate insulating film 35, a semiconductor layer 37 of a-Si, an n+ layer 39 for ohmic contact, and a metal layer 41 are sequentially deposited on an entire surface of the first substrate 31 including the gate line 33 and the gate electrode 33a. For reference, FIG. 5b shows the metal layer 41 on a top portion.

Figure 5C:
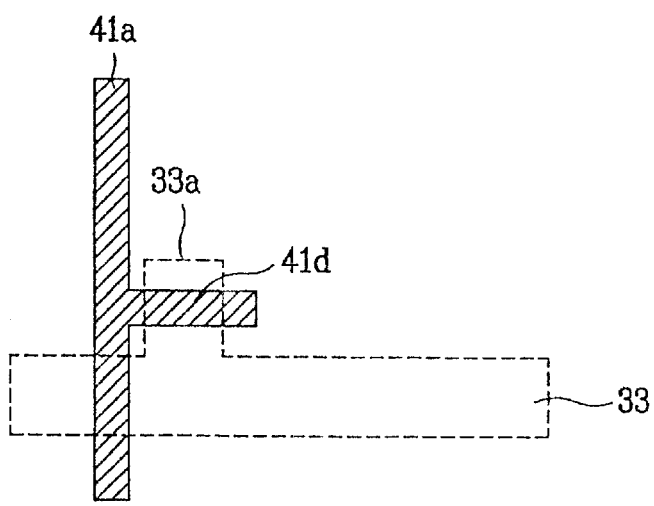
Figure 5D:
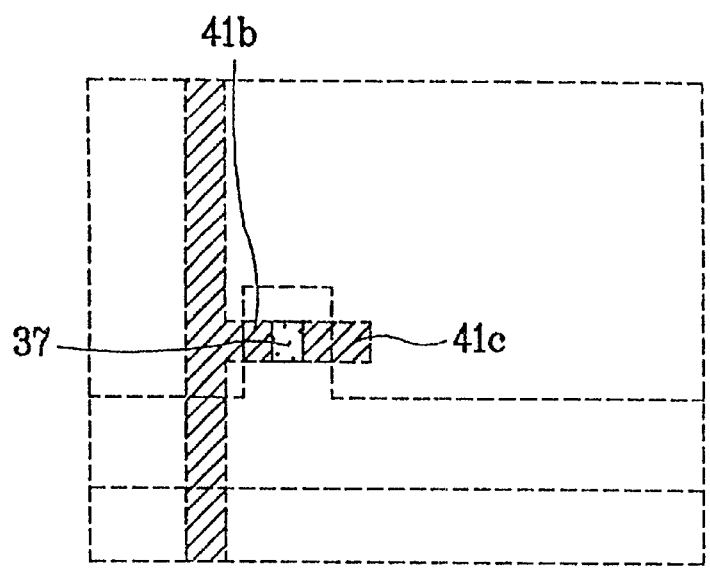

As shown in FIG. 5c, a data line 41a is formed to cross the gate line 33, and an extension pattern 41d is formed to extend to the gate electrode 33a. A portion of the extension pattern 41d is selectively removed to form source and drain electrodes 41b and 41c, as shown in FIG. 5d. The n+ layer 39 between the source and drain electrodes 41b and 41c is selectively removed. When the n+ layer 39 is removed, the gate insulating film 35 over a gate pad (not shown) is also removed to expose the gate pad.

Figure 5E:
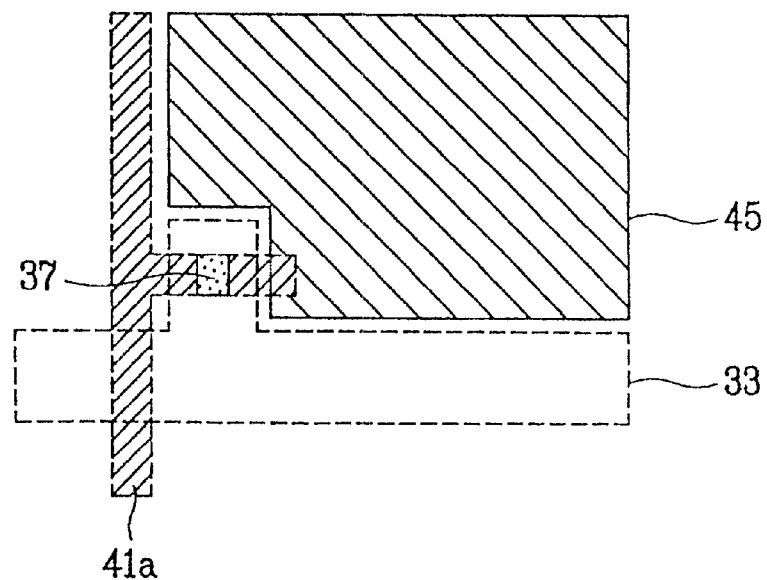
Figure 5F:
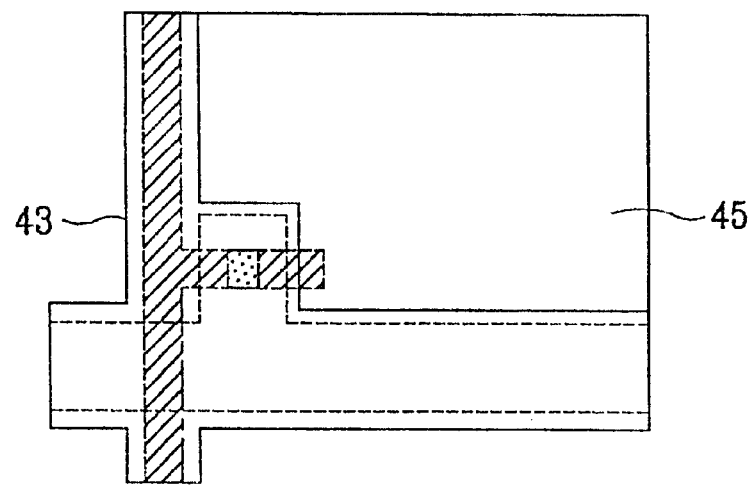

Subsequently, as shown in FIG. 5e, a pixel electrode 45 is formed to be directly connected with the drain electrode 41c. As shown in FIG. 5f, a black matrix pattern 43 of a light-shielding material is formed in a region other than the pixel electrode 45.

Figure 5G:
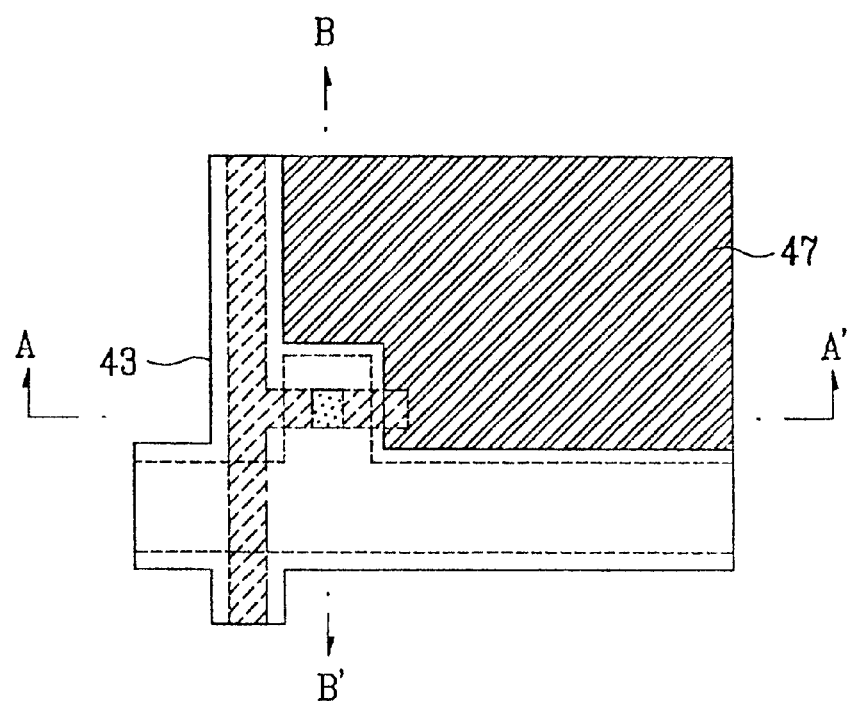

As shown in FIG. 5g, a color filter layer 47 is formed on the pixel electrode 45 by an electrodeposition process. A binder (not shown) is then formed on the color filter layer 47 and the black matrix pattern 43. Finally, the light-shielding material over the gate pad is removed for contact of the gate pad. Thus, the process for manufacturing a lower substrate for an LCD according to the second embodiment of the present invention is completed.

Although not shown, a common electrode is formed on the second substrate (upper substrate), and the first substrate and the second substrate are bonded to each other to inject liquid crystal material between them. The process for manufacturing an LCD according to the second embodiment of the present invention is completed.

As described above, in the second embodiment of the present invention, the black matrix pattern 43 and the color filter layer 47 are formed on the substrate in which a TFT and the pixel electrode 45 are arranged. When etching the metal layer to form the source and drain electrodes 41b and 41c, the n+ layer of a channel portion and the gate insulating film on the gate pad are simultaneously removed to minimize the number of masks and simplify the process steps.

A method for manufacturing an LCD according to the embodiment of the present invention will be described in more detail with reference to FIGS. 6a to 6g and 7a to 7g.

FIGS. 6a to 6g are sectional views taken along line A–A' of FIG. 5g, and FIGS. 7a to 7g are sectional views taken along line B–B' of FIG. 5g.

Figure 6A:
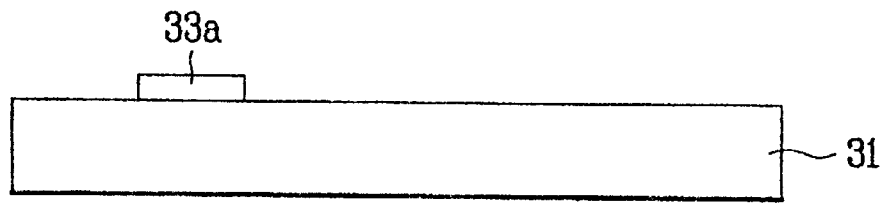
FIGS. 6a to 6g are sectional views illustrating a method for manufacturing a lower substrate for an LCD device according to the second embodiment of the present invention.
Figure 7A:
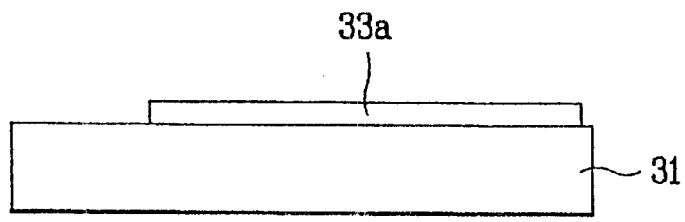
FIGS. 7a to 7g are sectional views taken along vertical crossing direction of FIGS. 7a to 7g illustrating a method for manufacturing a lower substrate for an LCD device according to the second embodiment of the present invention.

As shown in FIGS. 6a and 7a, a metal layer for a gate electrode, such as Al, Cr, Mo, Ta, and Al alloy, is formed on the first substrate 31 by a sputtering process and then patterned using a first mask (not shown) to form a gate line (not shown) and a gate electrode 33a.

Figure 6B:
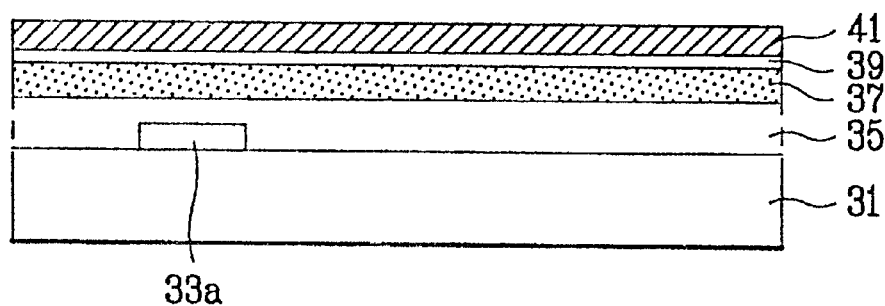
Figure 7B:
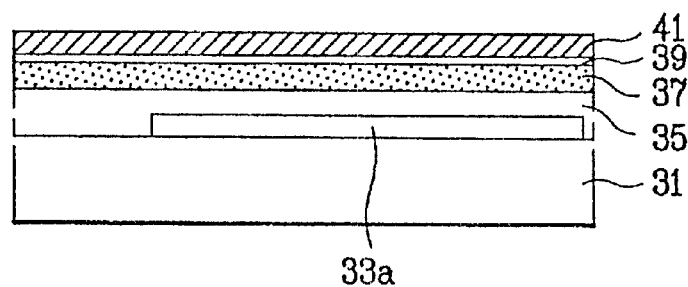

Afterwards, as shown in FIGS. 6b and 7b, a gate insulating film 35 of $SiN_x$ or $SiO_x$ is formed on an entire surface of the first substrate 31 including the gate electrode 33a by a CVD process. A semiconductor layer 37 of a-Si, an n+ layer 39 for ohmic contact, and a metal layer 41 for a data line and source and drain electrodes are sequentially deposited on the gate insulating film 35.

Figure 6C:
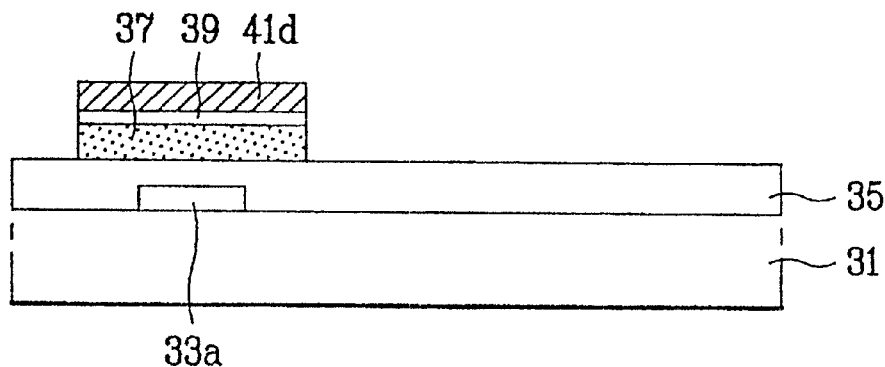
Figure 7C:
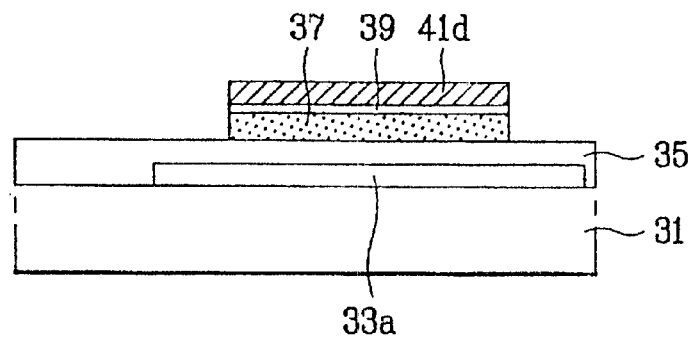

As shown in FIGS. 6c and 7c, the metal layer 41, the n+ layer 39, and the a-Si layer 36 are removed by an etching process using a second mask (not shown) so that a data line 41a and an extension pattern 41d are formed. The extension pattern 41d extends to an upper portion of the gate electrode 33a and will be divided into source and drain electrodes 41b and 41c in a later process.

Figure 6D:
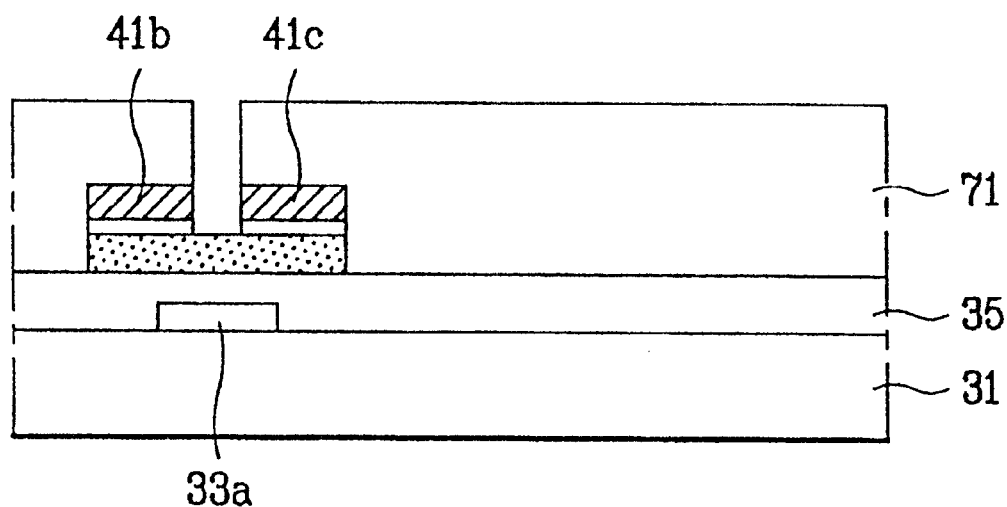
Figure 7D:
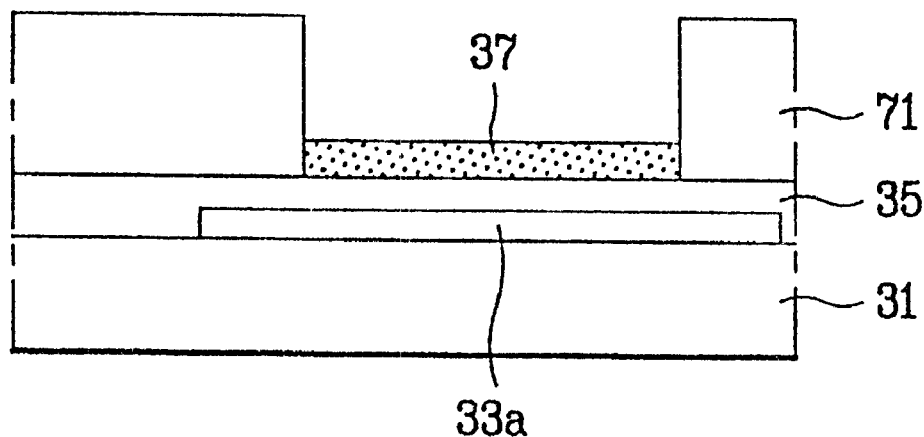

Subsequently, as shown in FIGS. 6d and 7d, a photoresist 71 is formed on the entire surface including the extension pattern 41d and then patterned by exposure and developing processes using a third mask (not shown). The extension pattern 41d is selectively removed by an etching process using the patterned photoresist 71, so that the source and drain electrodes 41b and 41c are formed.

At this time, the n+ layer 39 between the source and drain electrodes 41b and 41c is etched. Although not shown, the gate insulating film over the gate pad is also etched to expose the gate pad. Consequently, in the second embodiment of the present invention, it is noted that the formation of the source and drain electrodes 41b and 41c, etching of the n+ layer 39, and exposure of the gate pad are performed using one mask.

In other words, when the n+ layer 39 is etched, the gate insulating film 35 over the gate pad is also etched using etching selectivity. Thus, in a later process, since a light-shielding material layer for the black matrix pattern is formed and then etched in an etching process for contact of the gate pad, a process for exposing the gate pad becomes simple.

Figure 6E:
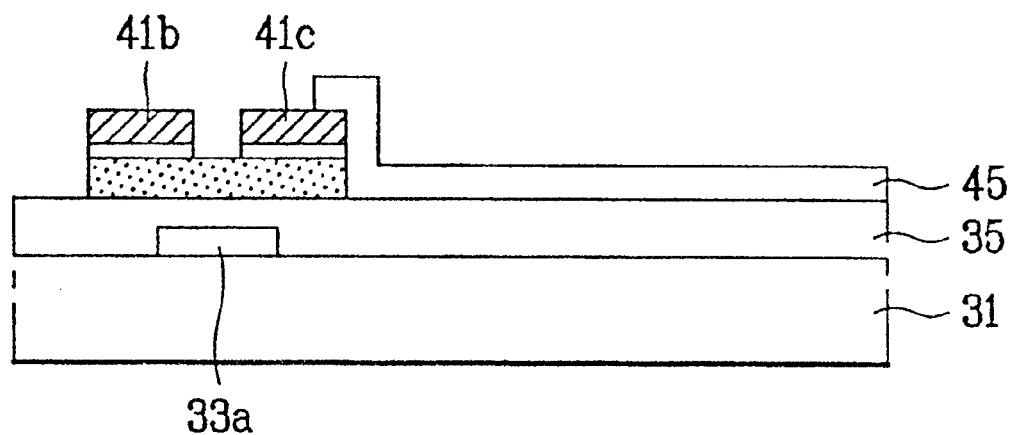
Figure 7E:
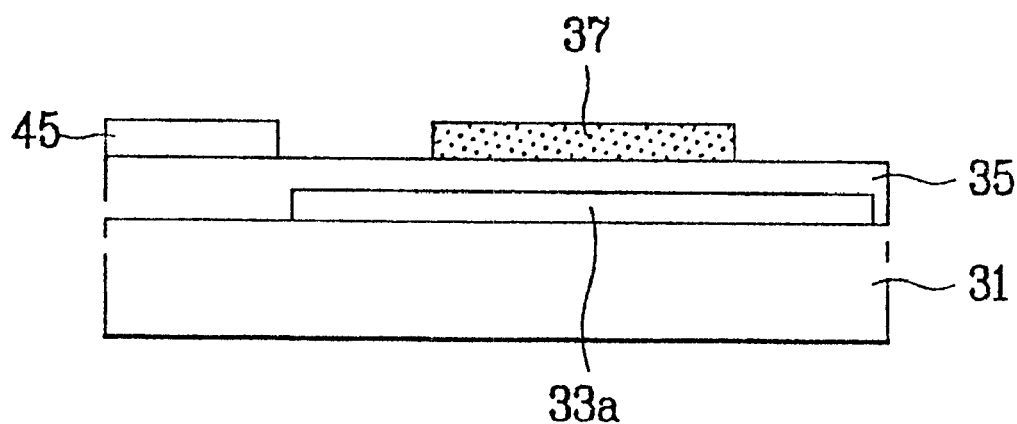

Afterwards, as shown in FIGS. 6e and 7e, the photoresist 71 is removed, and the pixel electrode 45 which is directly connected with the drain electrode 41c is formed. That is, after an ITO layer for a pixel electrode is formed on the entire surface including the source and drain electrodes 41b and 41c, the ITO layer is patterned using a fourth mask (not shown) to form the pixel electrode 45.

Figure 6F:
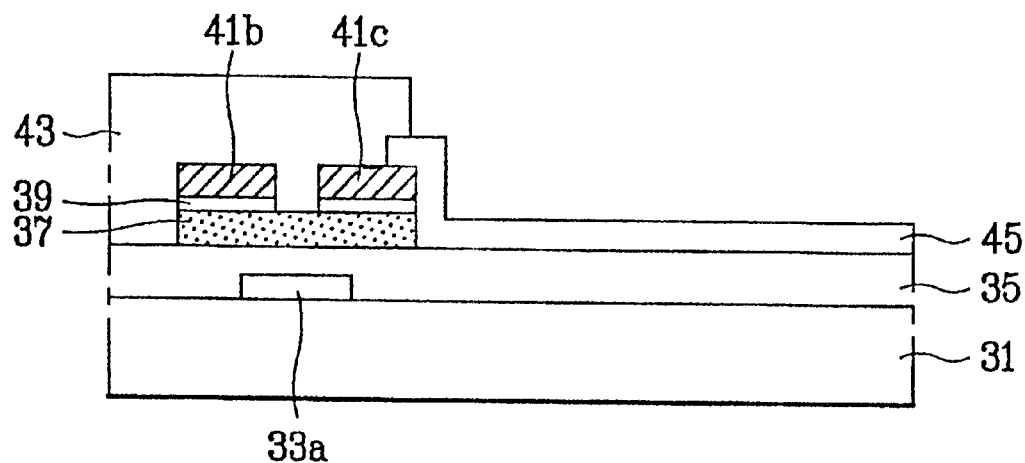
Figure 7F:
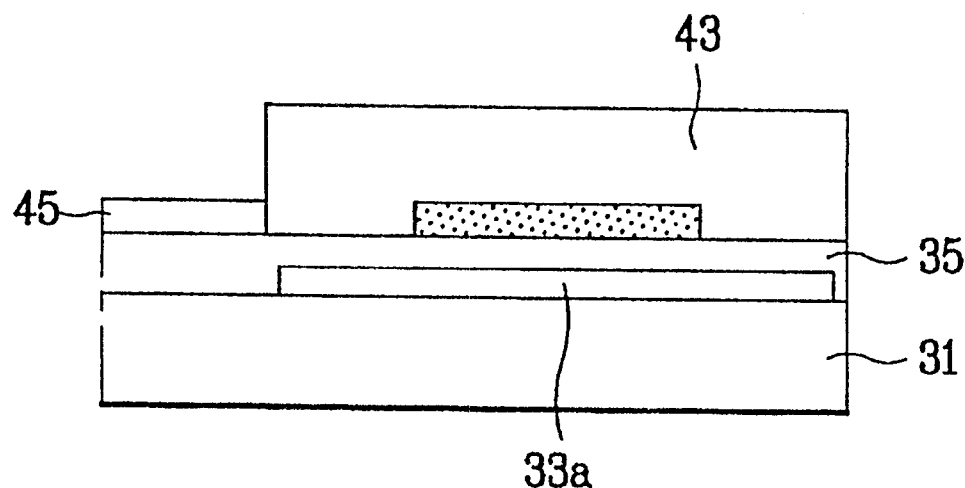

As shown in FIGS. 6f and 7f, the light-shielding material is formed on the entire surface including the pixel electrode 45. The light-shielding material is selectively removed by an etching process using a fifth mask (not shown) to form the black matrix pattern 43 in a region other than the pixel electrode 45.

Preferably, BCB is used as a material of the black matrix pattern 43. Instead, a metal film such as Cr or a carbon based organic material may be used as the black matrix pattern 43. Alternatively, a double layered film of Cr compound and Cr, or a triple layered film of Cr compound and Cr with another Cr compound interposed between them, may be used as the black matrix pattern 43 for the purpose of low reflection. For reference, since the black matrix pattern 43 serves as a passivation film, no passivation film is additionally required.

Figure 6G:
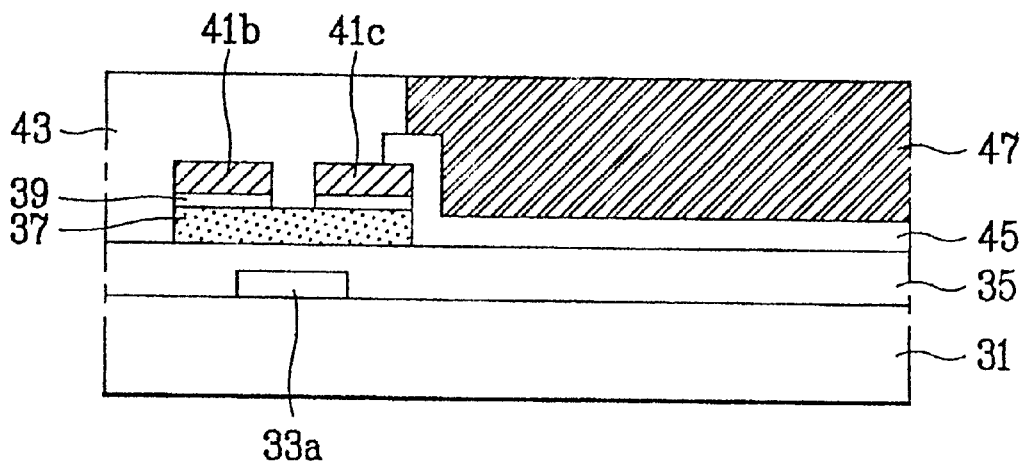
Figure 7G:
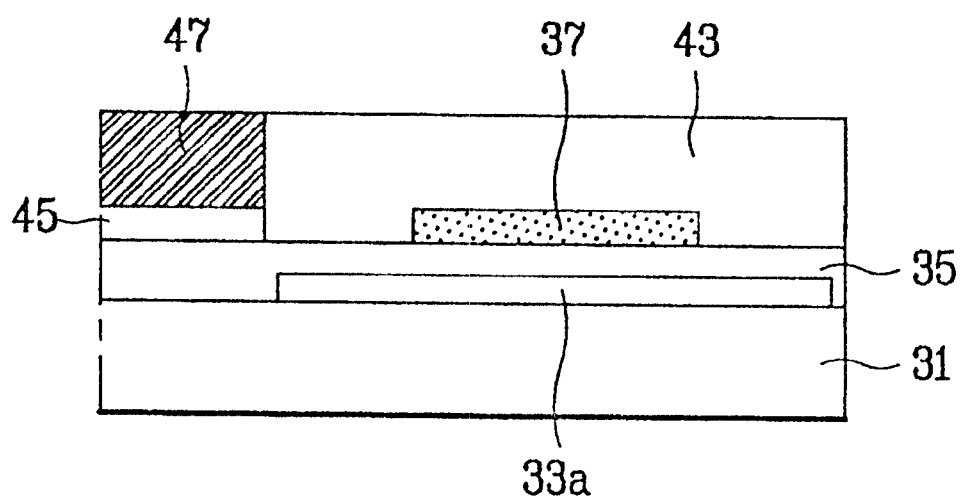

Subsequently, as shown in FIGS. 6g and 7g, a color filter material is electrodeposited on the pixel electrode 45 to form the color filter layer 47. A binder is then formed on the color filter layer 47 and the black matrix pattern 43 using a binding process.

Afterwards, although not shown, the light-shielding material is removed using a sixth mask to open the gate pad. Thus, the process for manufacturing a lower substrate according to the second embodiment of the present invention is completed.

Third Embodiment

FIGS. 8a to 8e are layouts illustrating a method for manufacturing an LCD according to the third embodiment of the present invention.

Figure 8A:
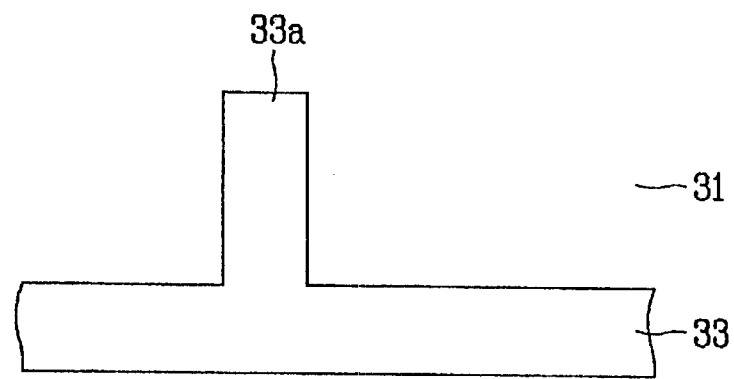
FIGS. 8a to 8e are plane views illustrating a method for manufacturing a lower substrate for an LCD device according to the third embodiment of the present invention.

As shown in FIG. 8a, a metal layer for a gate electrode, such as Al, Cr, Mo, Ta, and Al alloy, is formed on a first substrate 31 by a sputtering process and then patterned using a first mask (not shown) to form a gate line 33 and a gate electrode 33a.

Afterwards, a gate insulating film 35 of $SiN_x$ or $SiO_x$ is formed on an entire surface of the first substrate 31 including the gate line 33 and the gate electrode 33a by CVD process. A semiconductor layer 37 of a-Si, an n+ layer 39 for ohmic contact, and a metal layer 41 for a data line and source and drain electrodes are sequentially deposited on the gate insulating film 35.

Figure 8B:
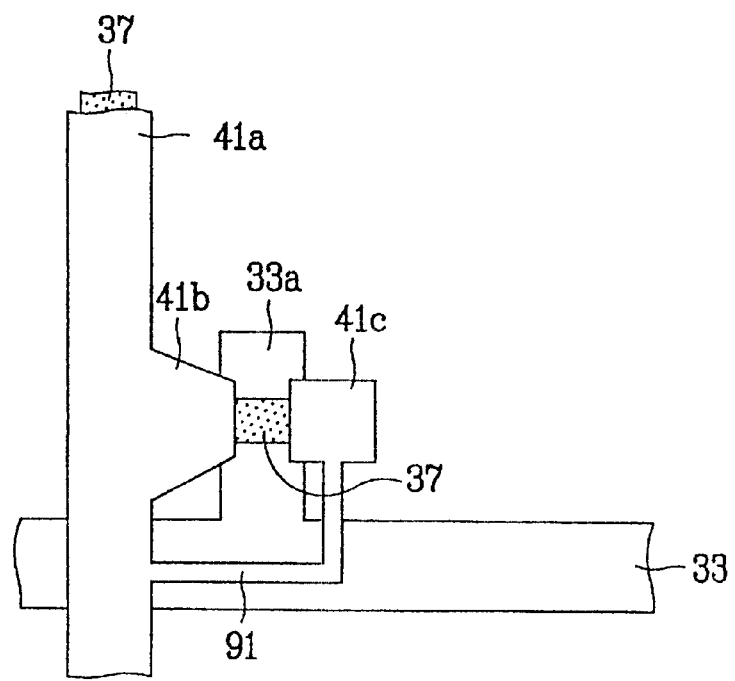

As shown in FIG. 8b, the metal layer 41 is selectively removed by an etching process using a second mask (not shown) so that a data line 41a, a source electrode 41b, a drain electrode 41c, and a connecting pattern 91 are formed. The data line 41a is formed to cross the gate line. The source electrode 41b extends from the data line 41a. The drain electrode 41c opposes the source electrode 41b. The connecting pattern 91 connects the drain electrode 41c with the data line 41a. At this time, the n+ layer 39 between the source and drain electrodes 41b and 41c is removed and at the same time the gate insulating film 35 in a pad region is removed to expose a gate pad (not shown).

That is, when etching the n+ layer 39, the gate insulating film 35 over the gate pad is also etched considering etching selectivity. Thus, in a later process, since a light-shielding material layer is formed and then etched in an etching process for forming a contact of the gate pad, a process for exposing the gate pad becomes simple.

Meanwhile, the connecting pattern 91 connects the data line 41a with the drain electrode 41c through an upper portion above the gate line 33. When a color filter material is electrodeposited to form a color filter layer in a later process, the connecting pattern 91 serves to electrodeposit the color filter material by a voltage only applied to the data line in a state such that the TFT is not driven. The connecting pattern 91 forms a single body with the data line 41a and the drain electrode 41c. Alternatively, the connecting pattern 91 may be formed by a separate process.

Figure 8C:
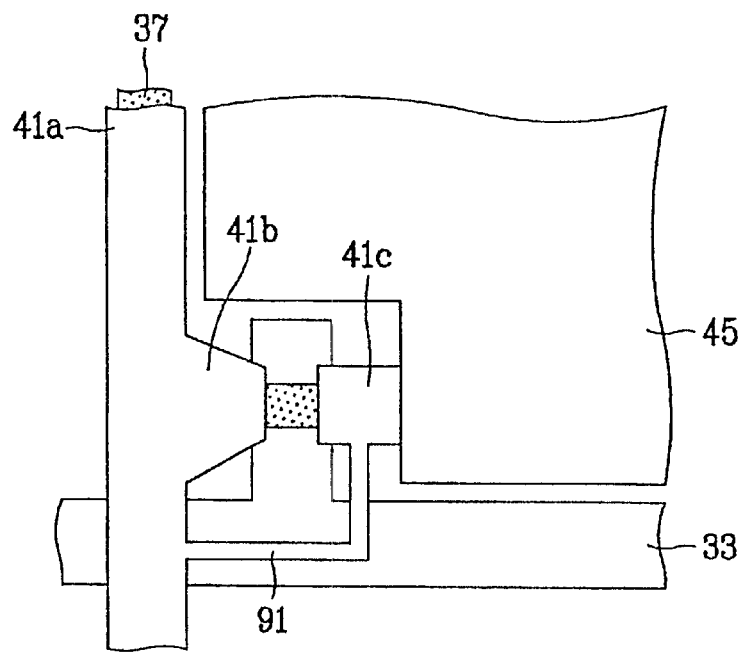

Subsequently, as shown in FIG. 8c, an transparent conductive (e.g., ITO) layer for a transparent electrode is formed on the entire surface including the source and drain electrodes 41b and 41c and then patterned using a third mask (not shown) to form a pixel electrode 45.

Figure 8D:
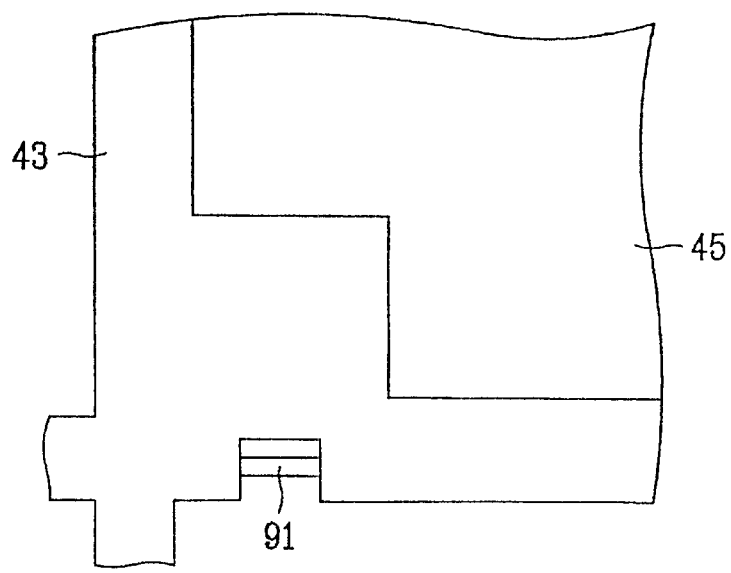

As shown in FIG. 8d, a light-shielding material is formed on the entire surface including the pixel electrode 45 and then patterned to remain on a region other then the pixel electrode 45, so that a black matrix pattern 43 is formed. At this time, the light-shielding material is patterned to expose the connecting pattern 91. This connecting pattern 91 allows the color filter material to be electrodeposited on the pixel electrode 45 with only the voltage applied to the data line, without driving the TFT, by connecting the data line 41a with the drain electrode 41c through the upper portion above the gate line 33. Once the color filter material is electrodeposited, the connecting pattern is removed to electrically open the data line 41a and the drain electrode 41c.

In the third embodiment of the present invention, the connecting pattern 91 has been exposed when the light-shielding material is patterned. However, after the color filter material is electrodeposited, the light-shielding material over the connecting pattern 91 may be removed when removing an unnecessary portion of the color filter layer so that the connecting pattern 91 is exposed.

Meanwhile, since the black matrix pattern 43 serves as a passivation film, no passivation film is additionally required. Accordingly, the process for forming a passivation film is omitted.

Preferably, BCB is used as a material of the black matrix pattern 43. Instead, a metal thin film such as Cr or a carbon based organic material may be used as the black matrix pattern 43. Alternatively, a double layered film of a Cr compound and Cr, or a triple layered film of a Cr compound and Cr, with another Cr compound interposed between them, may be used as the black matrix pattern 43 for the purpose of low reflection.

Figure 8E:
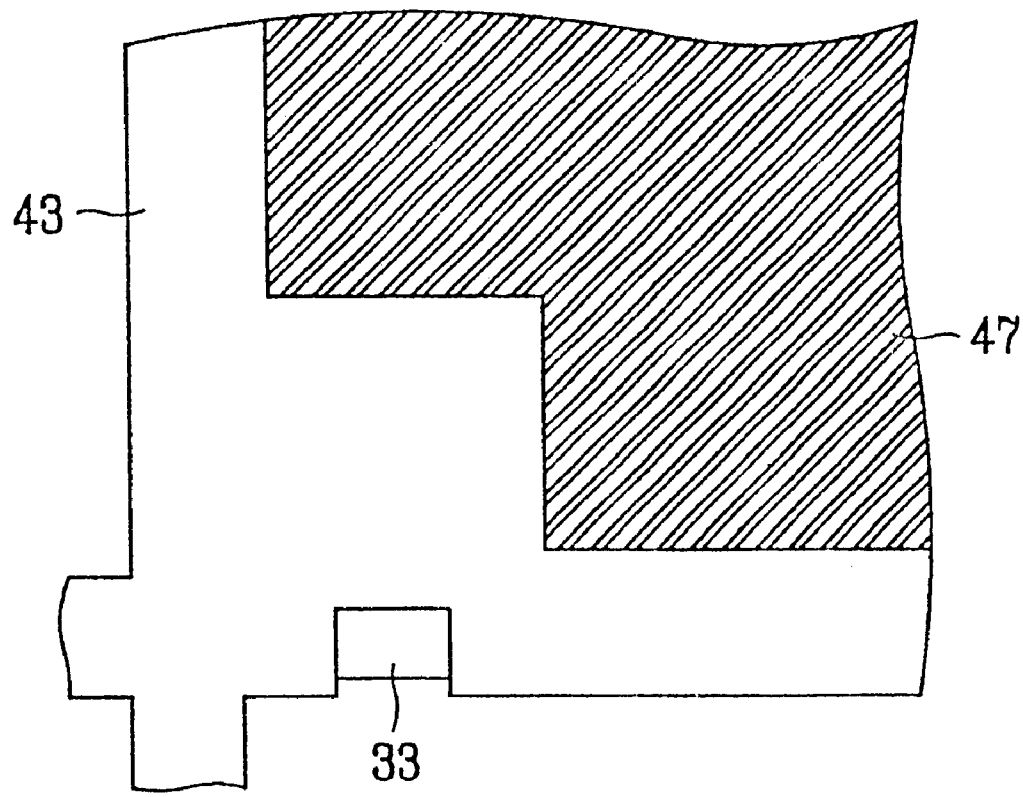

Subsequently, as shown in FIG. 8e, the color filter material is electrodeposited on the pixel electrode 45 to form the color filter layer 47. At this time, if a voltage is applied to the data line 41a in a state that the TFT is not driven, the voltage is transferred to the pixel electrode 47 through the connecting pattern 91 so that the color filter material can be electrodeposited.

When the color filter material is electrodeposited on the pixel electrode 45, the color filter material is also electrodeposited on the connecting pattern 91. The color filter material electrodeposited on the connecting pattern 91 is removed in a process for removing the color filter material electrodeposited on an unnecessary portion after the color filter layer is formed.

A binder (not shown) is then formed on the color filter layer 47 and the black matrix pattern 43 using a binding process. Afterwards, although not shown, the light-shielding material is selectively removed using a pad opening mask to open the gate pad. Thus, the process for manufacturing a lower substrate is completed.

Also, although not shown, a common electrode is formed on the second substrate (upper substrate), and the first substrate and the second substrate are bonded to each other to inject liquid crystal material between them. The process for manufacturing an LCD according to the third embodiment of the present invention is completed.

As described above, in the third embodiment of the present invention, the number of masks can remarkably be reduced. Also, since the color filter material can be deposited in a state that the TFT is not driven, it is possible to prevent characteristics of the TFT from being changed.

As aforementioned, the LCD device and method for manufacturing the same as described herein have the following advantages.

First, since all patterns required to manufacture an LCD are formed on one substrate and a plurality of patterns are formed using one mask, the number of masks can be minimized, thereby reducing the manufacturing cost.

Second, since the gate insulating film over the gate pad is etched when the n+ layer is etched, it is possible to easily perform a process for contact of the gate pad.

Finally, since the black matrix pattern is used as a passivation film, no separate passivation film is required. Accordingly, it is possible to simplify the process steps, thereby reducing turn around time (TAT).

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for manufacturing a liquid crystal display (LCD) device having a pixel region defined by gate and data lines, the method comprising:

forming a thin film transistor (TFT) on a first substrate, wherein the TFT includes a gate electrode, a source electrode, and a drain electrode;

forming a black matrix pattern in a region other than the pixel region in the absence of a passivation layer, the region including the source electrode and the drain electrode;

forming a pixel electrode in the pixel region; and forming a color filter layer on the pixel electrode.

2. The method of claim 1, further comprising:

forming a common electrode on a second substrate opposite to the first substrate; and forming a liquid crystal layer between the first and second substrates.

3. The method of claim 1, wherein forming the TFT includes:

forming a gate electrode on the first substrate;

sequentially depositing a gate insulating film, an a-Si layer, an n+ layer, and a metal layer on an entire surface including the gate electrode;

patterning the metal layer and the n+ layer;

selectively removing the patterned metal layer to form source and drain electrodes; and removing the n+ layer between the source and drain electrodes and the gate insulating film in a pad region.

4. The method of claim 3, wherein the a-Si layer of the pixel region is removed when the black matrix pattern is formed.

5. The method of claim 1, wherein the black matrix pattern is Benzocyclobutene (BCB).

6. The method of claim 5, wherein the black matrix pattern is used as a passivation film.

7. The method of claim 1, further comprising:

removing the black matrix pattern in a pad region after forming the color filter layer; and forming a binder on the color filter layer and the black matrix pattern.

8. The method of claim 1, wherein the color filter layer is formed by an electrodeposition method.

9. A method for manufacturing a liquid crystal display (LCD) device having a pixel region defined by gate and data lines, the method comprising:

forming a thin film transistor (TFT) on a first substrate, wherein the TFT includes a gate electrode, a source electrode, and a drain electrode;

forming a pixel electrode in the pixel region;

forming a black matrix pattern in a region other than the pixel electrode in the absence of a passivation layer, the region including the source electrode and the drain electrode; and forming a color filter layer on the pixel electrode.

10. The method of claim 9, wherein forming the TFT includes the steps of:

forming a gate electrode on the first substrate;

depositing a gate insulating film, an a-Si layer, an n+ layer, and a metal layer on an entire surface including the gate electrode;

patterning the metal layer, the n+ layer, and the a-Si layer;

selectively removing the patterned metal layer to form source and drain electrodes; and removing the n+ layer between the source and drain electrodes and the gate insulating film in a pad region.

11. The method of claim 9, further comprising the steps of:

forming a common electrode on a second substrate opposite to the first substrate; and forming a liquid crystal layer between the first and second substrates.

12. The method of claim 9, wherein the black matrix pattern is Benzocyclobutene (BCB).

13. The method of claim 12, wherein the black matrix pattern is used as a passivation film.

14. The method of claim 9, further comprising:

removing the black matrix pattern in a pad region after forming the color filter layer; and forming a binder on the color filter layer and the black matrix pattern.

15. The method of claim 10, wherein the color filter layer is formed by an electrodeposition method.

16. A method for manufacturing a liquid crystal display (LCD) device having a pixel region defined by gate and data lines, the method comprising:

forming a thin film transistor (TFT) and a connecting pattern on a first substrate, wherein the TFT includes a gate electrode, a source electrode, and a drain electrode, the connecting pattern connecting a drain electrode of the TFT with one of the data lines;

forming a pixel electrode connected with the drain electrode;

forming a black matrix pattern in a region other than the pixel region in the absence of a passivation layer, the region including the source electrode and the drain electrode;

forming a color filter layer on the pixel electrode; and forming a liquid crystal layer between the first substrate and a second substrate opposite to the first substrate.

17. The method of claim 16, wherein forming the TFT and the connecting pattern includes:

forming a gate electrode on the first substrate;

depositing a gate insulating film, an a-Si layer, an n+ layer, and a metal layer on an entire surface including the gate electrode;

patterning the metal layer and the n+ layer;

selectively removing the patterned metal layer to form source and drain electrodes; and removing the n+ layer between the source and drain electrodes and the gate insulating film in a pad region.

18. The method of claim 17, wherein the connecting pattern is formed to connect the data line with the drain electrode in a bypass way when the metal layer and the n+ layer are etched.

19. The method of claim 16, wherein forming the color filter layer includes electrodepositing a color filter material on the pixel electrode in a state that a voltage is applied to the data line.

20. The method of claim 19, further comprising:

removing the black matrix pattern in a pad region; and forming a binder on the black matrix pattern and the color filter layer.

21. The method of claim 16, wherein the black matrix pattern is patterned to exposed the connecting pattern.

22. The method of claim 21, wherein the connecting pattern is removed after forming the color filter layer.

23. The method of claim 16, wherein the step-a) forming a thin film transistor (TFT) and a connecting pattern on a first substrate includes:

forming a gate electrode on the first substrate;

depositing a gate insulating film, an a-Si layer, an n+ layer, and a metal layer on an entire surface including the gate electrode;

patterning the metal layer, the n+ layer, and the a-Si layer;

selectively removing the patterned metal layer to form source and drain electrodes; and removing the n+ layer between the source and drain electrodes and the gate insulating film in a pad region.

24. The method of claim 23, wherein the connecting pattern is formed when the metal layer, the n+ layer and the a-Si layer are etched.

25. The method of claim 16, wherein the color filter layer is formed by an electrodeposition method.

* * * * *